(12) United States Patent
Coverdale (10) Patent No.: US 10,889,322 B2
(45) Date of Patent: Jan. 12, 2021

(54) OSCILLATION LIMITED DRIVEN STEERING TRACK ASSEMBLY

(71) Applicant: Terra Drive Systems, Inc., Brookston, IN (US)

(72) Inventor: Kasandra Coverdale, West Lafayette, IN (US)

(73) Assignee: Terra Drive Systems, Inc., Brookston, IN (US)

( * ) Notice: Subject to any disclaimer, the term of this patent is extended or adjusted under 35 U.S.C. 154(b) by 375 days.

(21) Appl. No.: 16/049,052

(22) Filed: Jul. 30, 2018

(65) Prior Publication Data

US 2020/0031391 A1 Jan. 30, 2020

(51) Int. Cl.
| | | |
|---|---|---|
| *B62D 11/20* | (2006.01) | |
| *B62D 11/00* | (2006.01) | |
| *B62D 55/14* | (2006.01) | |
| *B62D 55/12* | (2006.01) | |
| *B62D 55/10* | (2006.01) | |
| *B62D 11/24* | (2006.01) | |
| *B62D 11/22* | (2006.01) | |

(52) U.S. Cl.
CPC ............ *B62D 11/20* (2013.01); *B62D 11/005* (2013.01); *B62D 55/10* (2013.01); *B62D 55/12* (2013.01); *B62D 55/14* (2013.01); *B62D 11/22* (2013.01); *B62D 11/24* (2013.01)

(58) Field of Classification Search
CPC ...... B62D 11/20; B62D 11/005; B62D 55/14; B62D 55/12; B62D 55/10; B62D 55/244; B62D 7/18; B62D 11/22; B62D 11/24
See application file for complete search history.

(56) References Cited

U.S. PATENT DOCUMENTS

| | | |
|---|---|---|
| 3,447,621 A | 6/1969 | Schoonover |
| 3,841,424 A | 10/1974 | Purcell |
| 5,322,310 A | 6/1994 | Hurlburt |
| 5,607,210 A | 3/1997 | Brazier |
| 5,954,148 A | 9/1999 | Okumura et al. |
| 6,095,275 A | 8/2000 | Shaw |

(Continued)

OTHER PUBLICATIONS

International Search Report in related PCT/US2019/043981.
Written Opinion of the ISA in related PCT/US2019/043981.

*Primary Examiner* — Ruth Ilan
*Assistant Examiner* — Marlon A Arce
(74) *Attorney, Agent, or Firm* — George Pappas; Barrett McNagny LLP (57) ABSTRACT

An oscillation limited driven steering track assembly includes a track mechanism coupled to and driven by a hydraulic motor. The motor is pivotally secured about a steering axis to a stub axle which partially supports a land vehicle. A longitudinally extensible and retractable apparatus extends between the track mechanism and the stub axle. One end of the apparatus is pivotally secured to a post secured to and extending from the track mechanism parallel with the motor shaft axis of rotation. A yoke is provided between the apparatus other end and pivotally secures the apparatus to the stub axle about the steering axis and, also, about a pivot axis perpendicular to the steering axis. Oscillation of the track mechanism about the motor shaft is limited by the apparatus. Simultaneously, the apparatus does not interfere with the track mechanism while the mechanism is rotated about the steering axis for steering the vehicle.

20 Claims, 13 Drawing Sheets

(56) References Cited

U.S. PATENT DOCUMENTS

| | | |
|---|---|---|
| 6,874,586 B2 | 4/2005 | Boivin et al. |
| 7,497,530 B2 | 3/2009 | Bessette |
| 7,552,979 B2 | 6/2009 | Christianson |
| 7,870,914 B2 | 1/2011 | Todd et al. |
| 8,056,656 B2 | 11/2011 | Todd et al. |
| 8,430,188 B2 | 4/2013 | Hansen |
| 8,801,115 B2 | 8/2014 | Hansen |
| 9,394,015 B2 | 7/2016 | Cox |
| 9,505,454 B1 | 11/2016 | Kautsch |
| 9,586,635 B2 | 3/2017 | Sewell |
| 2010/0012399 A1* | 1/2010 | Hansen .............. B62D 55/04 180/9.26 |
| 2011/0101135 A1* | 5/2011 | Korus .............. B62D 55/04 239/723 |
| 2020/0171903 A1* | 6/2020 | Rohde .............. B60G 1/04 |

\* cited by examiner

OSCILLATION LIMITED DRIVEN STEERING TRACK ASSEMBLY

BACKGROUND OF THE INVENTION

1. Field of the Invention

The present invention relates to the field of land vehicle track assemblies which are powered with hydraulic motors and used for supporting and driving vehicles such as agricultural combines, tractors and the like. More particularly, the present invention relates to a track assembly used for supporting, driving and steering the vehicle and, further, wherein the oscillation of the track assembly about the motor shaft axis of rotation is controlled and limited.

2. Background

Track assemblies which are powered with hydraulic motors and other means are known and commonly used for supporting and driving land vehicles such as agricultural combines, tractors and the like along the ground. Examples of such track assemblies are, for example, shown and described in Brazier U.S. Pat. No. 5,607,210; Okumura et al. U.S. Pat. No. 5,954,148; Christianson U.S. Pat. No. 7,552,979; Hansen U.S. Pat. No. 8,430,188; and, Sewell U.S. Pat. No. 9,586,635.

Rotation limiting devices for limiting the angle through which the track assembly may rotate relative to the vehicle chassis are also known as, for example, shown and described in Cox U.S. Pat. No. 9,394,015.

SUMMARY OF THE INVENTION

The present invention overcomes disadvantageous of prior track assemblies and provides an improved track assembly that can be used for supporting and driving the vehicle while, simultaneously, the oscillation of the track assembly about the motor shaft axis of rotation is controlled and limited and the track can be rotated about the steering axis for steering the vehicle.

In one form thereof, the present invention is directed to an oscillation limited driven steering track assembly which includes a track mechanism comprising a track frame, a sprocket and rollers rotatably secured to the track frame, and an endless track adapted to travel around the track frame and rollers and coupled to the sprocket. A motor is coupled to and rotatably drives the sprocket about a motor axis of rotation and thereby drives the track around the track frame and rollers. The motor is pivotally secured to a land vehicle about a steering axis whereby the motor and track mechanism are selectively rotated about the steering axis for steering the vehicle. A longitudinally extensible and retractable apparatus having first and second ends is provided and is extensible to an extended position having a first longitudinal distance between the first and second ends, and is retractable to a retracted position having a second longitudinal distance between the first and second ends. The first longitudinal distance is greater than the second longitudinal distance. The apparatus first end is pivotally secured to the track frame. The apparatus second end is pivotally secured to the vehicle about a pivot axis which is collinear with the steering axis. The track mechanism can oscillate about the motor axis of rotation and the oscillation thereof is limited to between a first radial position wherein the apparatus is in its extended position and a second radial position wherein the apparatus is in its retracted position. The track mechanism is also rotatable around the steering axis for steering the vehicle.

Preferably, the apparatus first end is pivotally secured to the track frame about an axis or rotation which is parallel with the motor axis of rotation. The apparatus first end can be pivotally secured to a post which is secured to and extends from the track frame and the post preferably extends parallel with the motor axis of rotation. The apparatus first and second ends are preferably rotatable about a longitudinal axis of rotation extending through the apparatus. The apparatus second end is preferably pivotally secured to the vehicle also about a second pivot axis which is perpendicular to the steering axis. The apparatus preferably comprises a plurality of longitudinally extensible and retractable cylinder assemblies or a pair of nested longitudinally extensible and retractable cylinder assemblies between its first and second ends whereby the apparatus is longitudinally extensible and retractable.

More preferably, the motor is pivotally secured to a C-frame bracket which is affixed to a stub axle. The stub axle at least partially supports the vehicle. A securement bracket can be provided having a collar projecting therefrom. Preferably, the securement bracket is sandwiched and secured between the C-frame bracket and the stub axle, and the apparatus second end is pivotally secured to the bracket collar. The bracket collar can be secured directly to the vehicle whereby the apparatus second end can be pivotally secured to the bracket collar.

In another form thereof, the present invention is directed to an oscillation limited driven steering track assembly including a track mechanism. The track mechanism includes a track frame, a sprocket and rollers rotatably secured to the track frame, and an endless track adapted to travel around the track frame and rollers and coupled to the sprocket. A motor is coupled to and rotatably drives the sprocket about a motor axis of rotation and thereby drives the track around the track frame and rollers. The motor is pivotally secured to a land vehicle about a steering axis whereby the motor and track mechanism are selectively rotated about the steering axis for steering the vehicle. A longitudinally extensible and retractable apparatus is provided having first and second ends. The apparatus is extensible to an extended position having a first longitudinal distance between the first and second ends and is retractable to a retracted position having a second longitudinal distance between the first and second ends. The first longitudinal distance is greater than the second longitudinal distance. The apparatus first end is pivotally secured to the track frame. A yoke is located between the apparatus second end and the vehicle. The yoke is pivotally secured to the apparatus second end about a first yoke axis and is pivotally secured to the vehicle about a second yoke axis. The first yoke axis is perpendicular to the second yoke axis. The track mechanism can oscillate about the motor axis of rotation and the oscillation thereof is limited to between a first radial position wherein the apparatus is in its extended position and a second radial position wherein the apparatus is in its retracted position. The track mechanism is also rotatable around the steering axis for steering the vehicle.

Preferably, the second yoke axis is collinear with the steering axis. The apparatus first end is preferably pivotally secured to the track frame about an axis or rotation which is parallel with the motor axis of rotation. The apparatus first end can be pivotally secured to a post which is secured to and extends from the track frame. The post preferably extends parallel with the motor axis of rotation. The apparatus first and second ends are preferably rotatable about a longitudinal axis of rotation extending through the apparatus. The apparatus preferably comprises a plurality of longitudinally extensible and retractable cylinder assemblies or a pair of nested longitudinally extensible and retractable cylinder assemblies between its first and second ends whereby the apparatus is longitudinally extensible and retractable.

More preferably, the motor is pivotally secured to a C-frame bracket which is affixed to a stub axle. The stub axle at least partially supports the vehicle. A securement bracket can be provided having a collar projecting therefrom. Preferably, the securement bracket is sandwiched and secured between the C-frame bracket and the stub axle, and the yoke is pivotally secured to the vehicle through the bracket collar. The bracket collar can be secured directly to the vehicle whereby the yoke is pivotally secured to the vehicle through the bracket collar.

BRIEF DESCRIPTION OF THE DRAWINGS

The above mentioned and other features and objects of this invention, and the manner of attaining them, will become more apparent and the invention itself will be better understood by reference to the following description of the embodiments of the invention taken in conjunction with the accompanying drawings, wherein.

Corresponding reference characters indicate corresponding parts throughout several views. Although the exemplification set out herein illustrates embodiments of the invention, in several forms, the embodiments disclosed below are not intended to be exhaustive or to be construed as limiting the scope of the invention to the precise forms disclosed.

DETAILED DESCRIPTION OF THE PREFERRED EMBODIMENTS

An oscillation limited driven track assembly constructed in accordance with the principles of the present invention is shown in the drawings and generally designated by the numeral 10. Assembly 10 includes a track mechanism 12 constructed in a known and customary manner. Track mechanism 12 comprises, in general, a frame 14, support rollers 16 rotatably mounted upon the frame 14, a sprocket 18 also rotatably mounted on the frame 14 and an endless belt/track 20 extending around the support rollers 16 and sprocket 18. Track 20 is coupled to the sprocket 18 whereby rotation of the sprocket 18 causes the track 20 to endlessly travel around the rollers 16 and track frame 14. Track 20 preferably comprises rubber pads/shoes.

Figure 1:
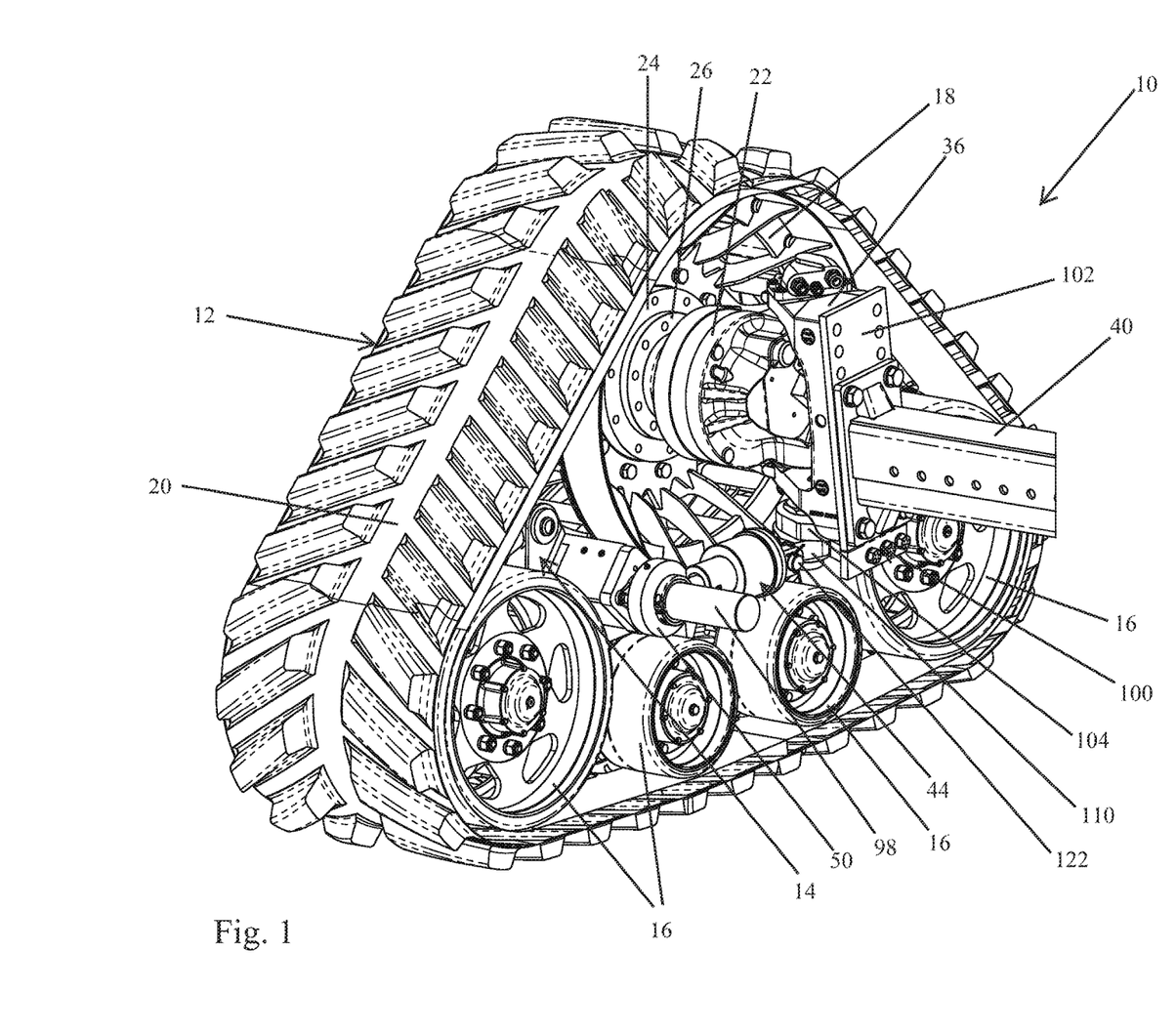
FIG. 1 is a perspective view of a an oscillation limited driven steering track assembly constructed in accordance with the principles of the present invention, as would be seen from inside the vehicle, and showing a track mechanism drivingly mounted on a hydraulic motor which is, in turn, pivotally secured to a stub axle about a steering axis.
Figure 3:
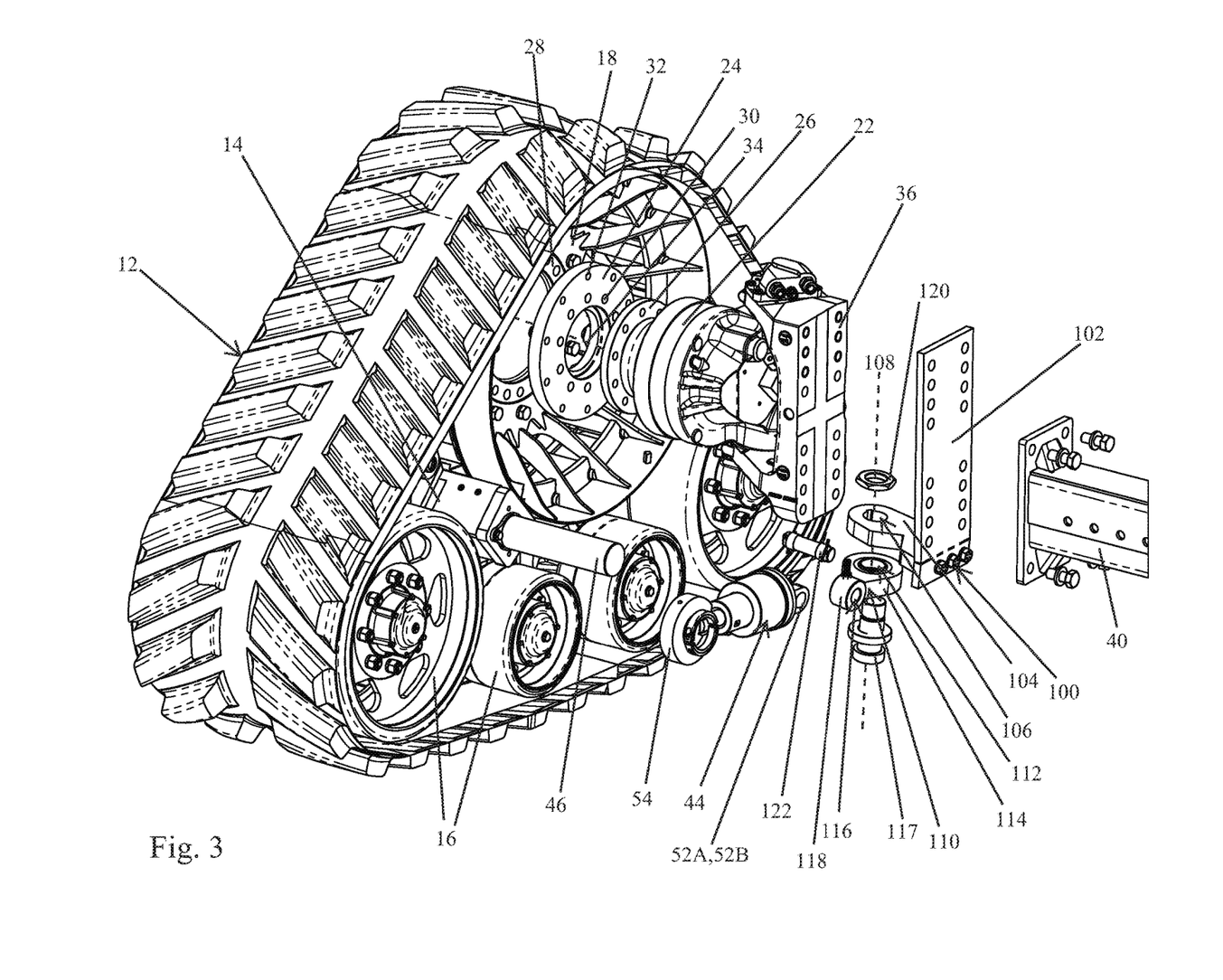
FIG. 3 is a perspective view similar to FIG. 1 but wherein the components connecting the track assembly to the stub axle and the components connecting the oscillation limiting apparatus between the track mechanism and the stub axle are shown exploded.
Figure 4:
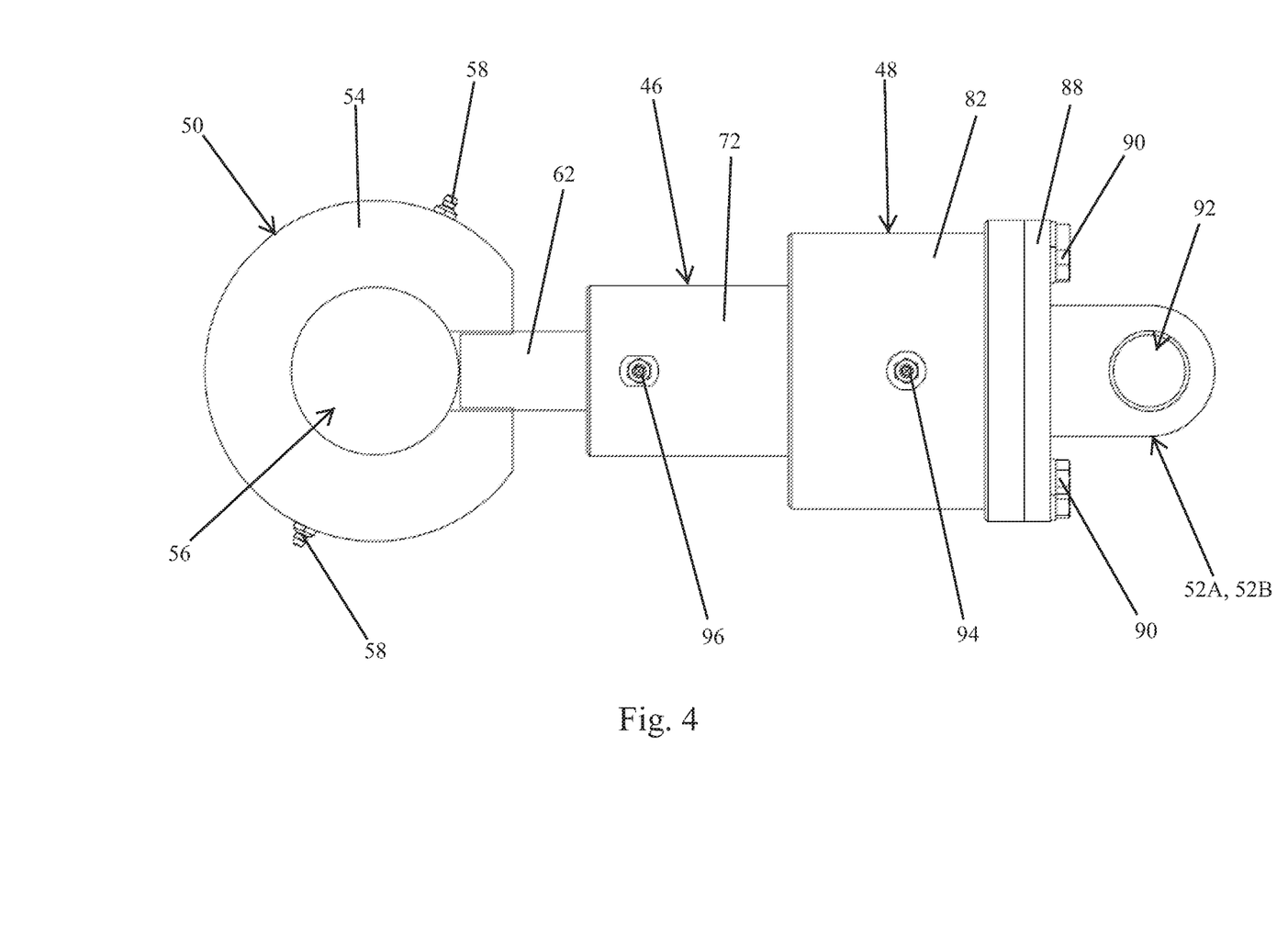
FIG. 4 is side elevation view of the oscillation limiting apparatus shown in FIGS. 1-3.
Figure 8:
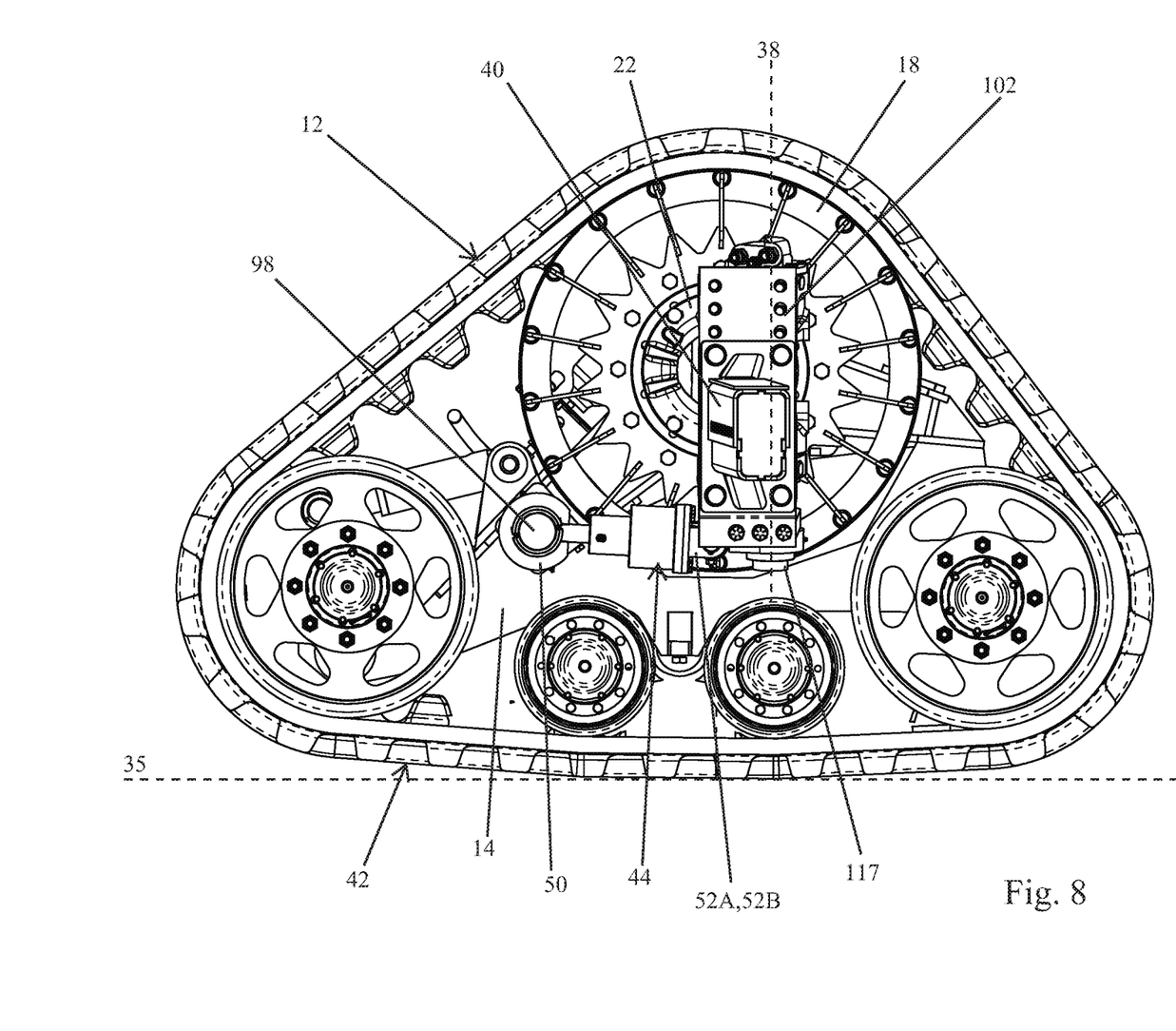
FIG. 8 is a side elevation view of the oscillation limited driven steering track assembly shown in FIG. 1, as would be seen from inside the vehicle, and showing the endless track thereof on level ground.

Sprocket 18 is coupled to and is selectively rotatably driven by a hydraulic motor 22. More particularly in this regard, as best seen in FIGS. 1 and 3, an adapter ring 24 is provided between the motor flange 26 and the sprocket flange 28. The motor flange 26 is, of course, affixed to and concentric with the motor shaft axis of rotation 34. Bolts (not shown) are used for securing the motor flange 26 to the adapter ring 24 using the inner diameter holes 30 of the adapter ring 24, and for securing the sprocket flange 28 to the adapter ring 24 using the outer diameter holes 32 of the adapter ring 24. Hence, sprocket 18 is rotatably driven about the hydraulic motor 22 axis of rotation 34 depicted as a dash line in FIGS. 3 and 11-13. Axis or rotation 34 is oriented/extends generally horizontally and parallel to horizontal ground diagrammatically depicted in FIGS. 8-10 with a dash line 35. Hydraulic hoses (not shown) are provided and are connected to the motor 22 for selectively rotatably driving the motor shaft and flange 26 affixed thereto in a known and customary manner.

Figure 11:
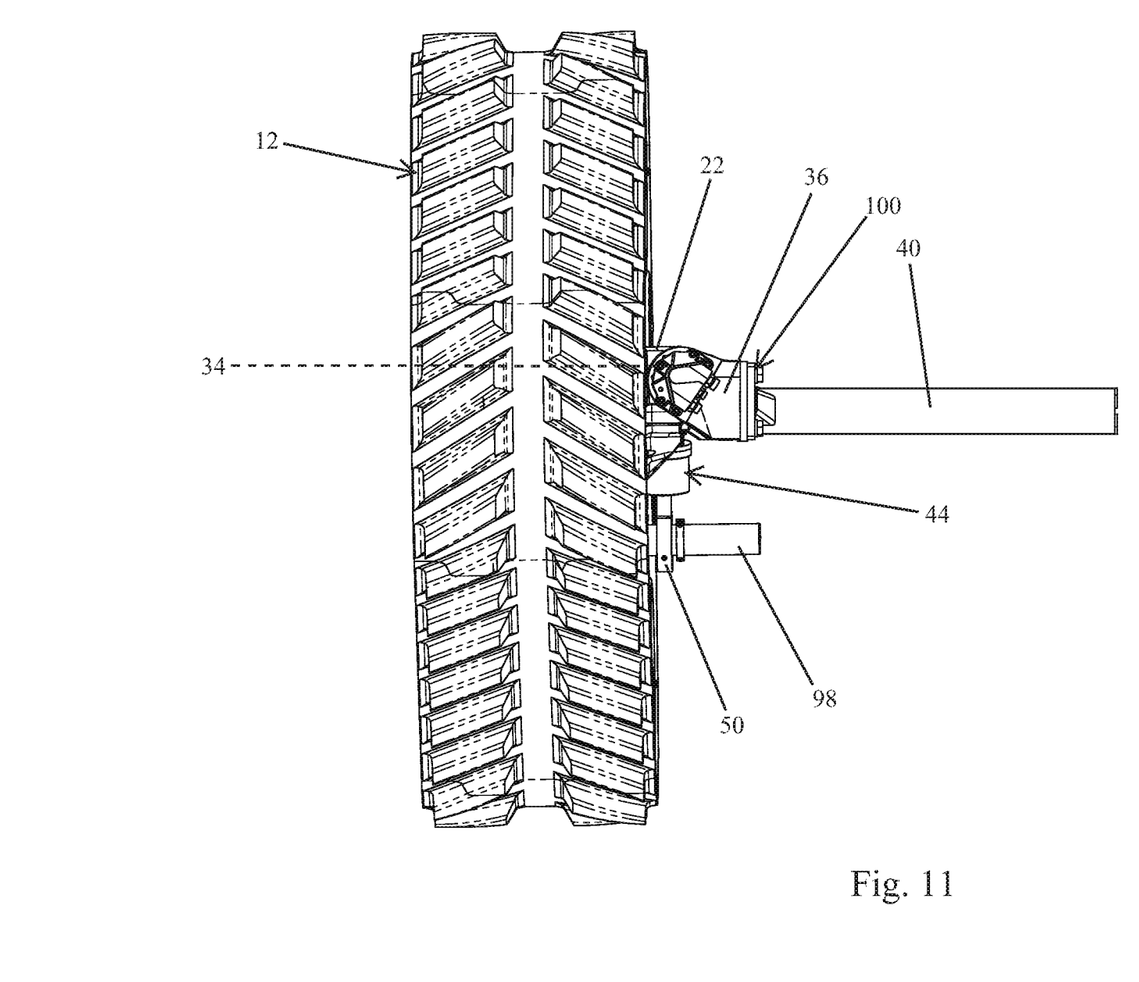
FIG. 11 is a plan view of the oscillation limited driven steering track assembly shown in FIG. 1 and showing the track mechanism directed forwardly/perpendicular to the stub axle.
Figure 12:
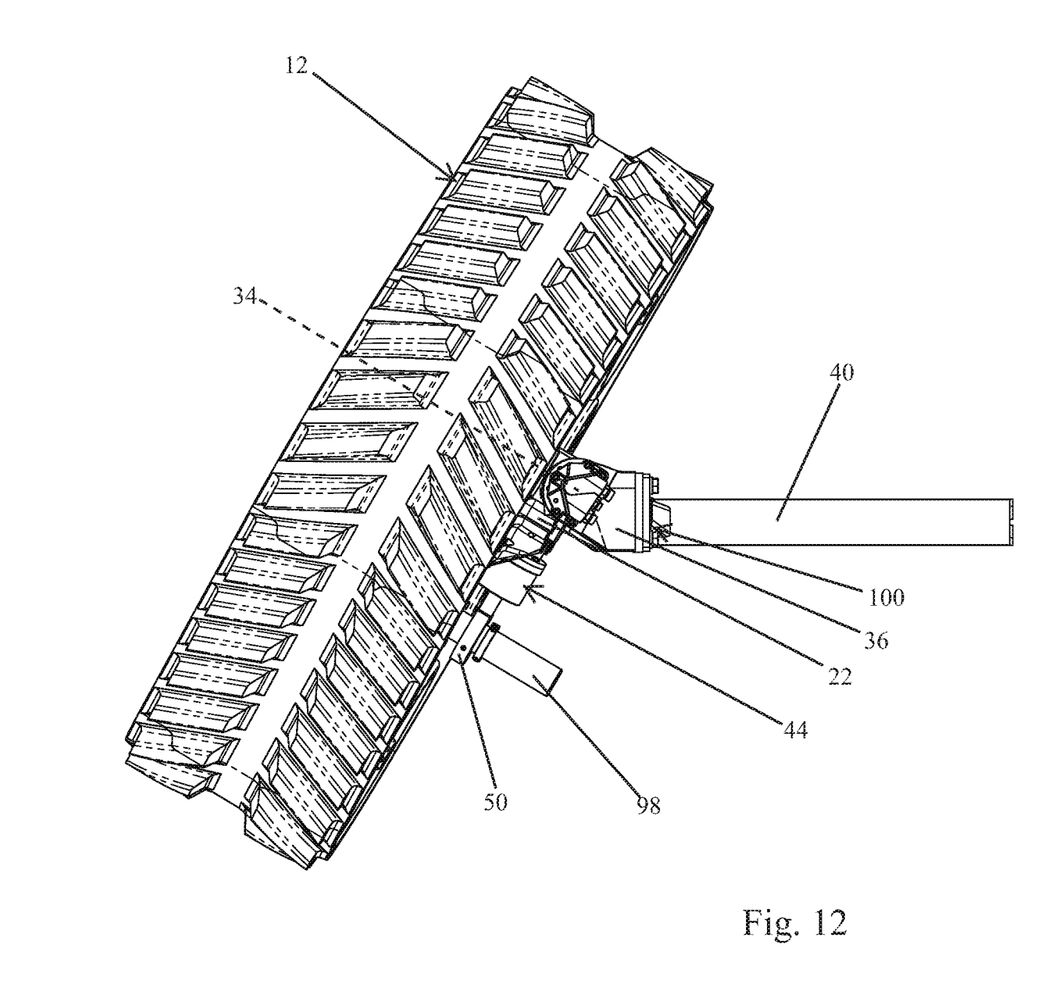
FIG. 12 is a plan view similar to FIG. 11 but showing the track assembly pivoted clockwise about the steering axis; and, FIG. 13 is a plan view similar to FIG. 11 but showing the track assembly pivoted counterclockwise about the steering axis.
Figure 13:
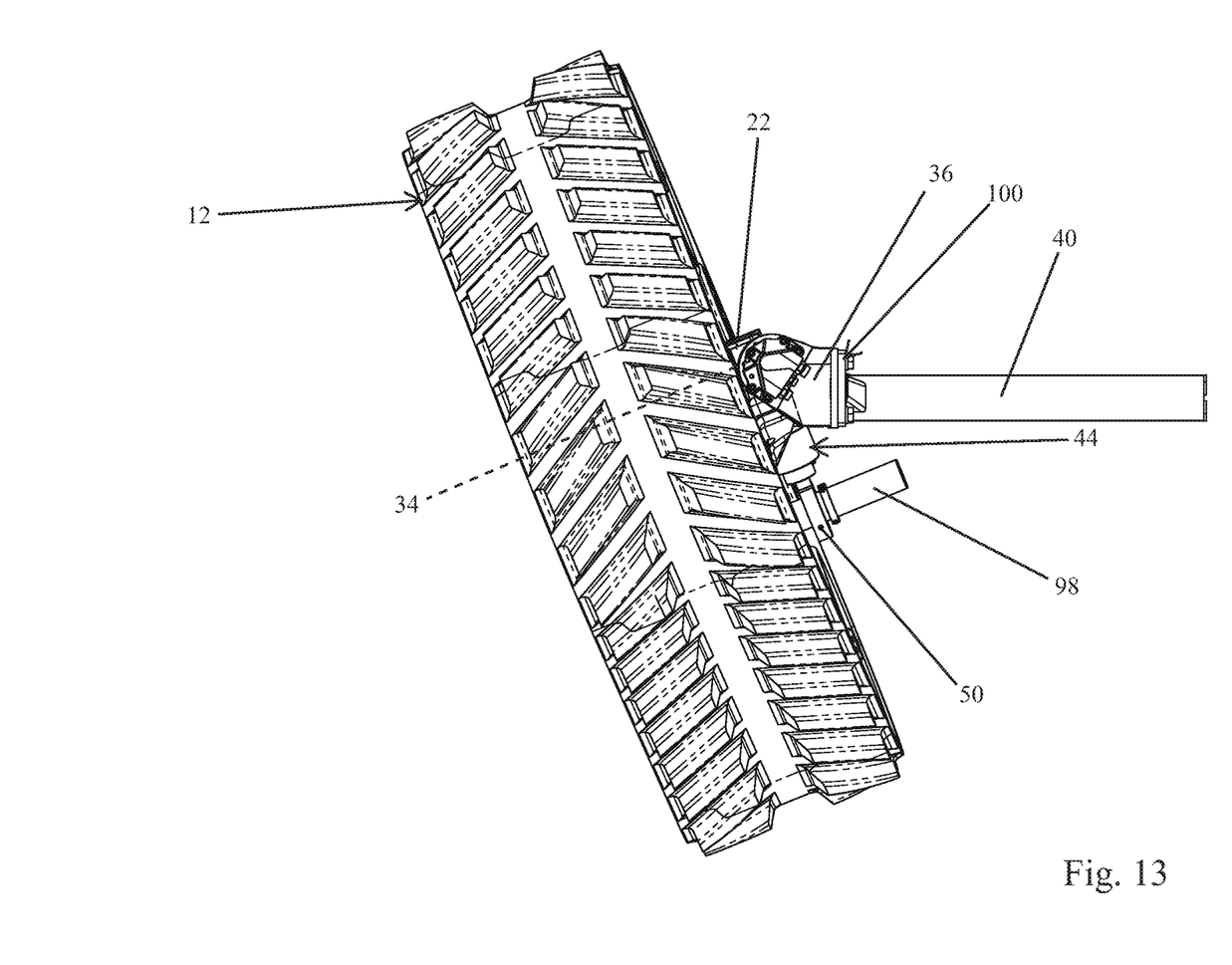

Hydraulic motor 22 is pivotally secured to a chassis of a land vehicle (not shown) such as agricultural combines, tractors and the like. More particularly, motor 22 is pivotally secured to a C-frame bracket 36 about a generally vertically oriented/extending steering axis 38 depicted in FIGS. 2 and 8-10 as a dash line. Steering axis 38 is generally perpendicular to the horizontal/ground 35. The C-frame bracket 36 is, in turn, affixed to a stub axle 40 which is secured to and supports the vehicle chassis. Steering control devices (not shown) are provided between the motor 22 and the stub axle 40/vehicle chassis for selectively rotating motor 22 and track mechanism 12 about the steering axis 38 as shown in FIGS. 11-13 and thereby steering the vehicle.

As should now be appreciated, the weight of the vehicle (or a part thereof) is transferred through the stub axle 40, motor 22 and track mechanism 12 to ground 35 while, simultaneously, the track 20 can be driven around the track frame 14 to drive/move the vehicle along the ground 35 and, further, the motor 22 and track mechanism 12 can be rotated about the steering axis 38 to steer the vehicle in a desired direction.

Figure 9:
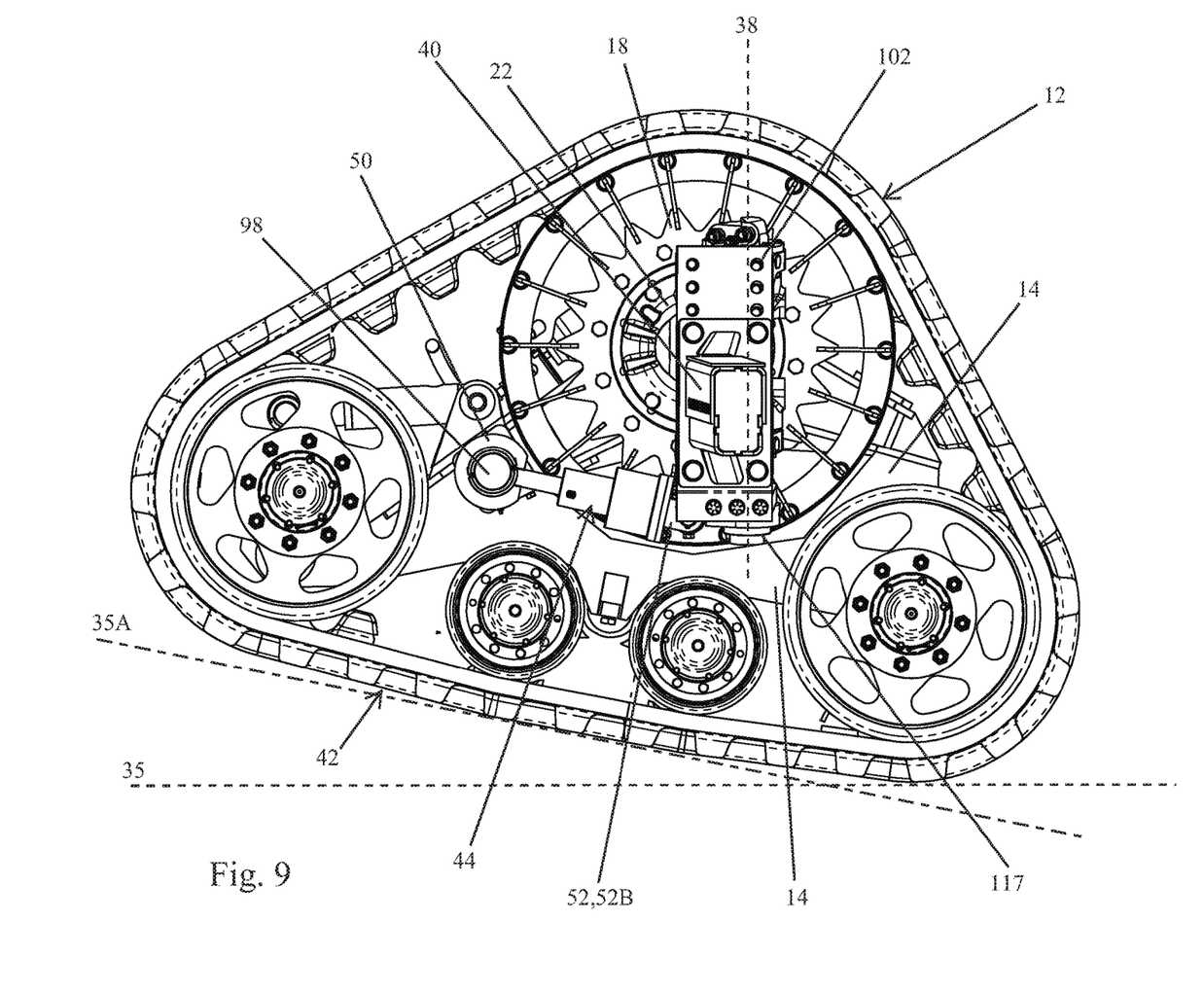
FIG. 9 is a side elevation view similar to FIG. 8 but showing the assembly on sloped ground and pivoted clockwise about the motor shaft axis, and showing the oscillation limiting apparatus in its fully extended rotation limiting position.
Figure 10:
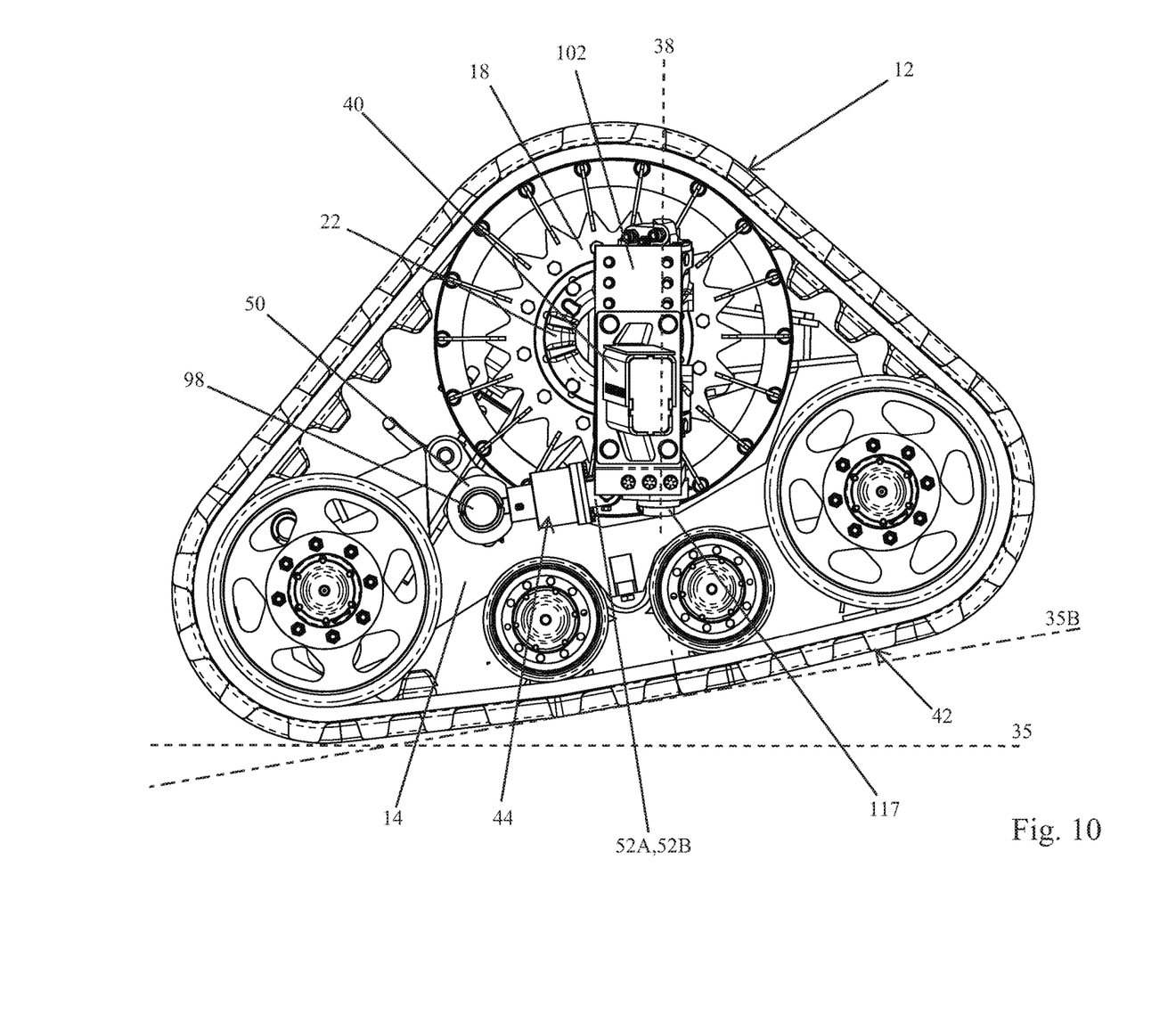
FIG. 10 is a side elevation view similar to FIG. 8 but showing the assembly on sloped ground and pivoted counterclockwise about the motor shaft axis, and showing the oscillation limiting apparatus in its fully retracted rotation limiting position.

As should also further be appreciated, because the entire track mechanism 12 is rotatably supported/secured to the motor 22, the entire track mechanism 12 can pivot/oscillate about the motor axis of rotation 34 as the slope of the ground changes relative to the horizontal 35, as depicted by sloped ground short-long dash lines 35A, 35B in FIGS. 9 and 10, so that the bottom surface 42 of the track mechanism 12 aligns with the sloped ground 35A, 35B. However, excessive oscillation of the track mechanism 12 about axis 34 can potentially cause the mechanism 12 to contact and damage the vehicle and is undesirable. To prevent such excessive oscillation, in accordance with the principles of the present invention, an oscillation limiting apparatus 44 is provided and is pivotally connected between the track frame 14 and the chassis/stub axle 40.

As best seen in FIGS. 4-7, the oscillation limiting apparatus 44 comprises one or more longitudinally extensible and retractable cylinder assemblies 46, 48 between a terminal end connecting ring 50 and a pair of spaced terminal connecting rings 52A, 52B. Preferably, cylinder assemblies 46, 48 are nested with one another as described herein below and shown in the drawings.

Figure 5:
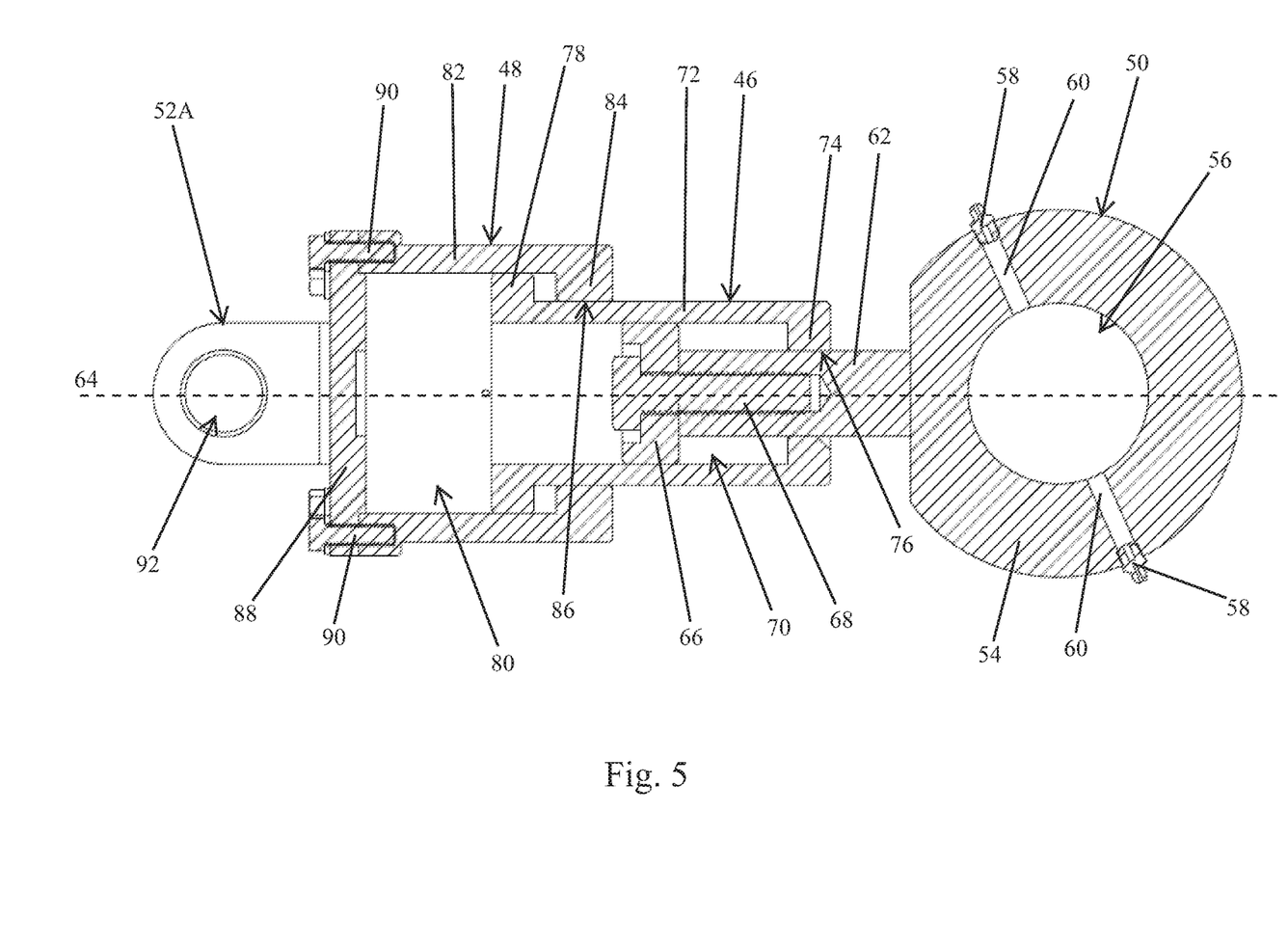
FIG. 5 is cross sectional view of the oscillation limiting apparatus shown in FIG. 4 and taken along line 5-5 of FIG. 6.
Figure 6:
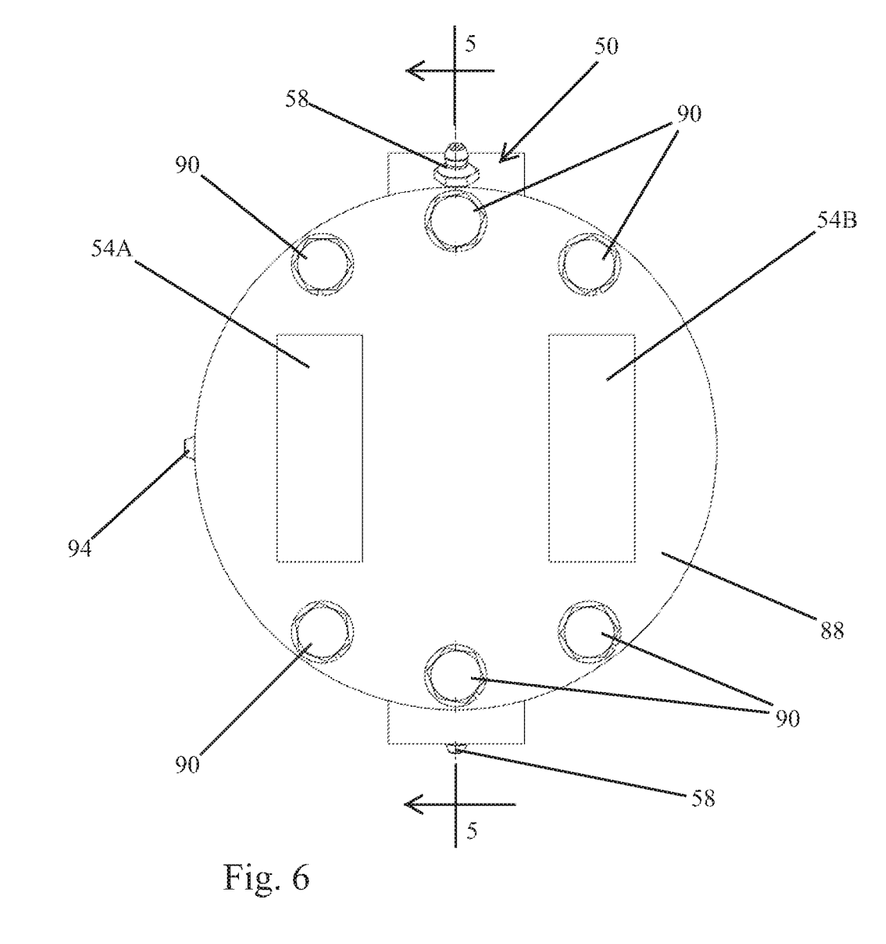
FIG. 6 is an end view of the oscillation limiting apparatus as viewed from the right in FIG. 4.
Figure 7:
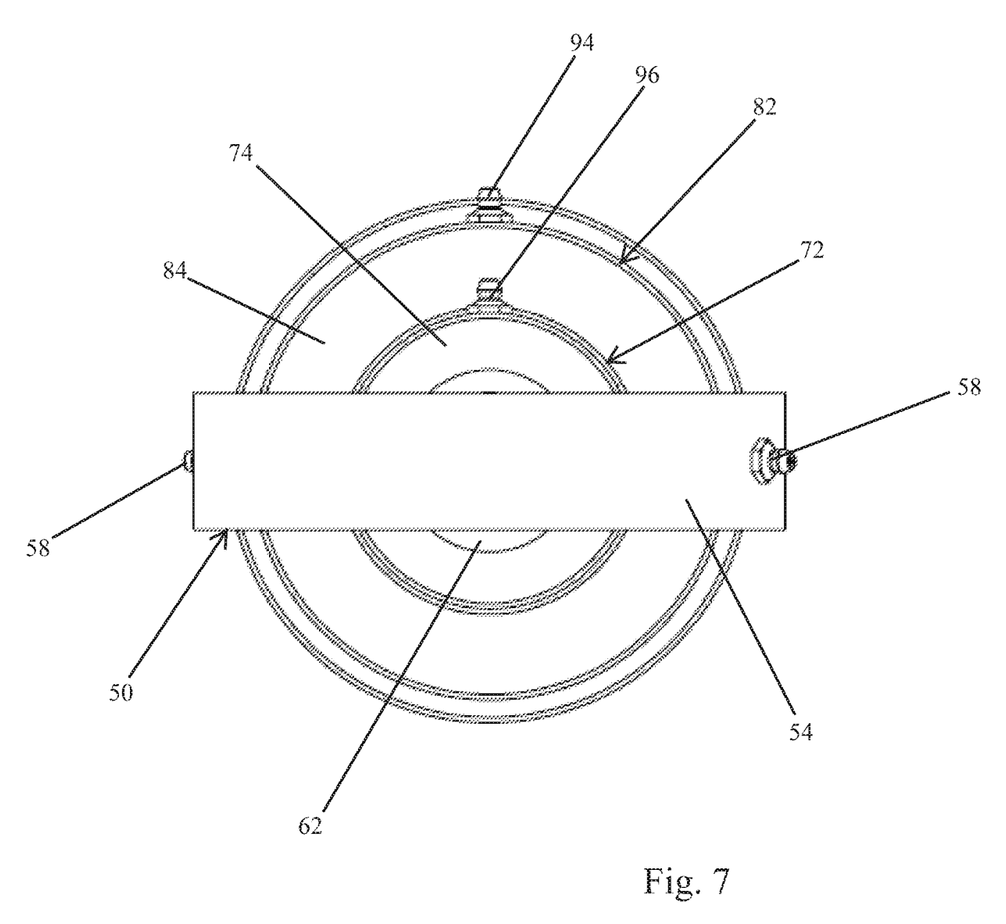
FIG. 7 is an end view of the oscillation limiting apparatus as viewed from the left in FIG. 4.

Connecting ring 50 comprises a ring shaped member 54 defining a cylindrical bore 56. Zerks 58 and grease ports 60 are provided and extend through the ring shaped member 54 to the cylindrical bore 56 for providing grease within the bore 56. A piston rod 62 is affixed to the ring member 54 and extends transversely therefrom and from the cylindrical bore 56, and concentrically along the longitudinal axis 64 of the oscillation limiting apparatus 44. A piston 66 is provided and affixed to the other terminal end of the piston rod 62 with a fastener/bolt 68.

The piston rod 62 and piston 66 are slidingly received within a longitudinally extending cylindrical bore 70 formed within a central cylinder 72. At one longitudinal terminal end thereof, central cylinder 72 includes a closure wall 74 having a cylindrical opening 76 extending longitudinally therethrough. Cylindrical opening 76 is slightly larger than and is adapted to longitudinally slidingly receive the piston rod 62 therethrough. At its other longitudinal end, central cylinder 72 includes a radially projecting rim 78.

The central cylinder 72 and its radially projecting rim 78 is slidingly received within a longitudinally extending cylindrical bore 80 formed within a drum 82. Similar to the central cylinder 72, at one longitudinal terminal end of the drum 82, the drum 82 includes a closure wall 84 having a cylindrical opening 86 extending longitudinally therethrough. Cylindrical opening 86 is slightly larger than and is adapted to longitudinally slidingly receive the central cylinder 72 therethrough. The other longitudinal terminal end of the drum 82 is closed with a disk shaped lid 88 which is securely fastened to the drum 82 with fasteners/bolts 90. The connecting rings 52A, 52B are fastened to or are integrally formed with the lid 88 and extend longitudinally therefrom. Connecting rings 52A, 52B are spaced from each other as shown and are each provided with holes 92 which are aligned with one another along an axis which is transverse to the oscillation limiting apparatus longitudinal axis 64.

Hence, cylinder assembly 46 essentially comprises the piston rod 62 and piston 66 longitudinally slidingly received within the cylindrical bore 70 of the central cylinder 72, and the cylinder assembly 48 essentially comprises the central cylinder 72 and rim 78 longitudinally slidingly received within the cylindrical bore 80 of the drum 82. A zerk and grease port 94 is provided through the central cylinder 72 for providing grease within the cylindrical bore 70. A zerk and grease port 96 is provided through the drum 82 for providing grease within the cylindrical bore 80. Holes (not shown) are provided through each of the central cylinder 72 and drum 82 for preventing accumulation of air pressure therein.

As should now be appreciated with particular reference to FIG. 5, the connecting ring 50 and the connecting rings 52A, 52B are longitudinally extensible and retractable from each other a predetermined distance and are, also, rotatable about the longitudinal axis 64. More particularly, the piston rod 62 is longitudinally slidable into the cylindrical bore 70 until the connecting ring 50 abuts the closure wall 74 and is slidable out of cylindrical bore 70 until the piston 66 abuts the closure wall 74. Hence, the piston rod 62 is longitudinally slidable a distance equal to its longitudinal length less the width/thickness of the closure wall 74. Also, the central cylinder 72 is longitudinally slidable into the drum cylindrical bore 80 until its rim 78 abuts the lid 88 and is slidable out of cylindrical bore 80 until its rim 78 abuts the closure wall 84. Hence, the central cylinder 72 is longitudinally slidable a distance equal to the longitudinal length of the drum cylindrical bore 80 less the width/thickness of the central cylinder rim 78.

As should now also be appreciated, the oscillation limiting apparatus 44 is longitudinally extensible to a maximum distance between its ring 50 and rings 50A, 50B when the piston 66 abuts the central cylinder closure wall 74 and the central cylinder rim 78 abuts the drum closure wall 84, and is longitudinally retractable to a minimum distance between its ring 50 and rings 50A, 50B when the connecting ring 50 abuts the central cylinder closure wall 74 and the central cylinder rim 78 abuts the drum lid 88.

As mentioned herein above, the oscillation limiting apparatus 44 is pivotally connected between the track frame 14 and the chassis/stub axle 40. For the track frame 14 to oscillation limiting apparatus 44 pivotal connection, a post 98 is rigidly affixed to the track frame 14 and extends generally parallel to the axis of rotation 34 of the motor 22. The post 98 is received through the cylindrical bore 56 of the connecting ring 50. Accordingly, the connecting ring 50 and oscillation limiting apparatus 44 are pivotable about the longitudinal axis of the post 98.

Figure 2:
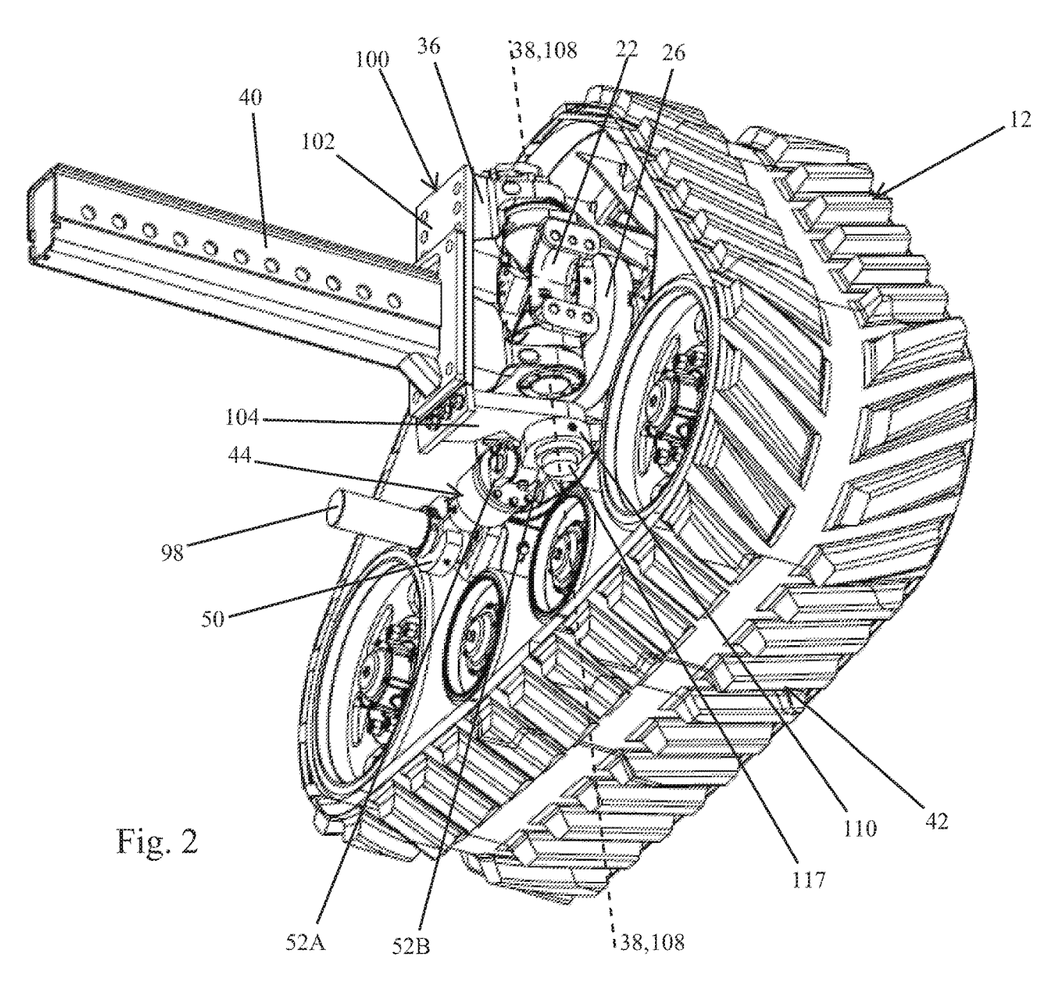
FIG. 2 is another perspective view of the oscillation limited driven steering track assembly shown in FIG. 1 as would be seen from inside and below the vehicle.

For the chassis/stub axle 40 to oscillation limiting apparatus 44 pivotal connection, a securement bracket 100 is provided and includes a plate 102 and collar 104 affixed to and projecting generally perpendicular from the plate 102. The securement bracket plate 102 is sandwiched and thereby secured between the C-frame bracket 36 and the stub axle 40. The collar 104 includes a cylindrical bore 106 extending along and aligned with an axis 108. After assembly, when the securement bracket plate 102 is sandwiched between the C-frame bracket 36 and the stub axle 40, the collar bore axis 108 is generally aligned/collinear with the steering axis 38 as best seen in FIG. 2.

A yoke 110 is provided for securing the oscillation limiting apparatus connecting rings 52A, 52B to the securement bracket collar 104. Yoke 110 includes a vertical cylindrical bore 112 extending though a base portion 114 and a horizontal cylindrical bore 116 extending through a boss 118. The longitudinal axis of the base portion vertical bore 112 is situated generally perpendicular to the longitudinal axis of the boss horizontal bore 116. A king pin 117 extends through the yoke base portion vertical bore 112 and the securement bracket collar bore 106 and is secured thereat with a nut 120. The yoke base portion 116 is, hence, pivotally secured to the collar 104 about the king pin 117 and the collar bore and steering axes 108, 38.

At the other end of the yoke 110, boss 118 is received between the connecting rings 52A and 52B whereby the holes 92 of the connecting rings 52A, 52B are longitudinally aligned with the boss horizontal bore 116. A pivot pin 122 extends through the holes 92 of the connecting rings 52A, 52B and the boss horizontal bore 116. The yoke boss 118 is, hence, pivotally secured to the oscillation limiting apparatus connecting rings 52A, 52B about pivot pin 122 and the aligned axes of the boss bore 116 and connecting rings holes 92.

In use and operation, the oscillation limiting apparatus 44 functions to limit the rotation of the track mechanism 12 about the motor axis or rotation 34 between the clockwise rotational position depicted in FIG. 9 and the counterclockwise rotational position depicted in FIG. 10. The clockwise rotational position depicted in FIG. 9 is preferably limited to 15° from the horizontal position depicted in FIG. 8 and the counterclockwise rotational position depicted in FIG. 10 is preferably also limited to 15° from the horizontal position depicted in FIG. 8. The oscillation limiting apparatus 44 hence preferably allows/limits the track mechanism 12 to rotate a maximum of 30° about the motor axis or rotation 34. Also, the oscillation limiting apparatus 44 is in its maximum longitudinal distance/fully extended position when the track mechanism 12 has rotated clockwise as depicted in FIG. 9, and is in its minimum longitudinal position/fully retracted position when the track mechanism 12 has rotated counterclockwise as depicted in FIG. 10. Advantageously, as best seen in FIGS. 11-13 and should now also be appreciated, the oscillation limiting apparatus 44 does not interfere with steering of the vehicle as the track assembly 12 is rotated about the steering axis 38.

While the invention has been described as having an exemplary design, the present invention may be further modified within the spirit and scope of this disclosure. This application is therefore intended to cover any variations, uses, or adaptations of the invention using its general principles.

What is claimed is:

1. An oscillation limited driven steering track assembly comprising:
    a track mechanism including a track frame, a sprocket and rollers rotatably secured to said track frame, and an endless track adapted to travel around said track frame and rollers and coupled to said sprocket;
    a motor coupled to and rotatably driving said sprocket about a motor axis of rotation and thereby driving said track around said track frame and rollers;
    wherein said motor is pivotally secured to a land vehicle about a steering axis whereby the motor and track mechanism are selectively rotated about the steering axis for steering the vehicle;
    a longitudinally extensible and retractable apparatus having first and second ends;
    wherein said apparatus is extensible to an extended position having a first longitudinal distance between said first and second ends and is retractable to a retracted position having a second longitudinal distance between said first and second ends, said first longitudinal distance being greater than said second longitudinal distance;
    said apparatus first end being pivotally secured to said track frame;
    said apparatus second end being pivotally secured to the vehicle about a pivot axis which is collinear with said steering axis; and,
    wherein said track mechanism can oscillate about said motor axis of rotation and said oscillation is limited to between a first radial position wherein said apparatus is in its extended position and a second radial position wherein said apparatus is in its retracted position, and further wherein said track mechanism is rotatable around said steering axis for steering the vehicle.

2. The oscillation limited driven steering track assembly claim of 1 wherein said apparatus first end is pivotally secured to said track frame about an axis of rotation which is parallel with said motor axis of rotation.

3. The oscillation limited driven steering track assembly claim of 1 wherein said apparatus first end is pivotally secured to a post which is secured to and extends from said track frame parallel with said motor axis of rotation.

4. The oscillation limited driven steering track assembly of claim 1 wherein said apparatus first and second ends are rotatable about a longitudinal axis of rotation extending through said apparatus.

5. The oscillation limited driven steering track assembly claim 1 wherein said apparatus second end is pivotally secured to the vehicle also about a second pivot axis which is perpendicular to said steering axis.

6. The oscillation limited driven steering track assembly of claim 1 wherein said apparatus comprises a plurality of longitudinally extensible and retractable cylinder assemblies between its said first and second ends whereby said apparatus is longitudinally extensible and retractable.

7. The oscillation limited driven steering track assembly of claim 1 wherein said apparatus comprises a pair of nested longitudinally extensible and retractable cylinder assemblies between its said first and second ends whereby said apparatus is longitudinally extensible and retractable.

8. The oscillation limited driven steering track assembly of claim 1 wherein said motor is pivotally secured to a C-frame bracket which is secured to a stub axle, said stub axle at least partially supporting the vehicle.

9. The oscillation limited driven steering track assembly of claim 8 further comprising a securement bracket having a collar projecting therefrom, said securement bracket being sandwiched and secured between said C-frame bracket and said stub axle, and wherein said apparatus second end is pivotally secured to said bracket collar.

10. The oscillation limited driven steering track assembly of claim 1 further comprising a bracket collar secured to the vehicle and wherein said apparatus second end is pivotally secured to said bracket collar.

11. An oscillation limited driven steering track assembly comprising:
    a track mechanism including a track frame, a sprocket and rollers rotatably secured to said track frame, and an endless track adapted to travel around said track frame and rollers and coupled to said sprocket;
    a motor coupled to and rotatably driving said sprocket about a motor axis of rotation and thereby driving said track around said track frame and rollers;
    wherein said motor is pivotally secured to a land vehicle about a steering axis whereby the motor and track mechanism are selectively rotated about the steering axis for steering the vehicle;
    a longitudinally extensible and retractable apparatus having first and second ends;
    wherein said apparatus is extensible to an extended position having a first longitudinal distance between said first and second ends and is retractable to a retracted position having a second longitudinal distance between said first and second ends, said first longitudinal distance being greater than said second longitudinal distance;

said apparatus first end being pivotally secured to said track frame;

a yoke located between said apparatus second end and the vehicle, wherein said yoke is pivotally secured to said apparatus second end about a first yoke axis and is pivotally secured to the vehicle about a second yoke axis, said first yoke axis being perpendicular to said second yoke axis; and, wherein said track mechanism can oscillate about said motor axis of rotation and said oscillation is limited to between a first radial position wherein said apparatus is in its extended position and a second radial position wherein said apparatus is in its retracted position, and further wherein said track mechanism is rotatable around said steering axis for steering the vehicle.

12. The oscillation limited driven steering track assembly of claim 11 wherein said second axis is collinear with said steering axis.

13. The oscillation limited driven steering track assembly claim of 11 wherein said apparatus first end is pivotally secured to said track frame about an axis of rotation which is parallel with said motor axis of rotation.

14. The oscillation limited driven steering track assembly claim of 11 wherein said apparatus first end is pivotally secured to a post which is secured to and extends from said track frame parallel with said motor axis of rotation.

15. The oscillation limited driven steering track assembly of claim 11 wherein said apparatus first and second ends are rotatable about a longitudinal axis of rotation extending through said apparatus.

16. The oscillation limited driven steering track assembly of claim 11 wherein said apparatus comprises a plurality of longitudinally extensible and retractable cylinder assemblies between its said first and second ends whereby said apparatus is longitudinally extensible and retractable.

17. The oscillation limited driven steering track assembly of claim 11 wherein said apparatus comprises a pair of nested longitudinally extensible and retractable cylinder assemblies between its said first and second ends whereby said apparatus is longitudinally extensible and retractable.

18. The oscillation limited driven steering track assembly of claim 11 wherein said motor is pivotally secured to a C-frame bracket which is affixed to a stub axle, said stub axle at least partially supporting the vehicle.

19. The oscillation limited driven steering track assembly of claim 18 further comprising a securement bracket having a collar projecting therefrom, said securement bracket being sandwiched and secured between said C-frame bracket and said stub axle, and wherein said yoke is pivotally secured to the vehicle through said bracket collar.

20. The oscillation limited driven steering track assembly of claim 11 further comprising a bracket collar secured to the vehicle and wherein said yoke is pivotally secured to the vehicle through said bracket collar.

* * * * *